United States Patent [19]
Huynh et al.

[11] Patent Number: 5,218,514
[45] Date of Patent: Jun. 8, 1993

[54] COMPACT HIGH POWER PERSONAL COMPUTER WITH IMPROVED AIR COOLING SYSTEM

[75] Inventors: Duy Q. Huynh; Prabhakara R. Vadapalli, both of Boca Raton, Fla.

[73] Assignee: International Business Machines Corporation, Armonk, N.Y.

[21] Appl. No.: 911,598

[22] Filed: Jul. 10, 1992

[51] Int. Cl.⁵ ............................................. H05K 7/20
[52] U.S. Cl. ................................... 361/384; 165/80.3; 361/415
[58] Field of Search ................ 361/383, 384, 390–395, 361/412, 413; 98/415, 1; 174/15.1, 16.1; 165/80.3; 364/708; 307/150

[56] References Cited

U.S. PATENT DOCUMENTS

| | | | |
|---|---|---|---|
| 4,644,443 | 2/1987 | Swensen et al. | 361/384 |
| 4,702,154 | 10/1987 | Dodson | 98/1 |
| 4,977,532 | 12/1990 | Borkowicz et al. | 364/708 |
| 5,006,959 | 4/1991 | Freige et al. | 361/384 |
| 5,101,320 | 3/1992 | Bhargava et al. | 361/384 |
| 5,136,468 | 8/1992 | Wong et al. | 361/393 |

Primary Examiner—Gerald P. Tolin
Attorney, Agent, or Firm—G. E. Grosser; D. R. McKechnie

[57] ABSTRACT

A personal computer housing has a plurality of air intake openings located around the sides and front. A fan is mounted at the rear of the housing and sucks or draws coolant air through the intakes and exhausts the air to the rear. A bulk power supply is mounted along one side of the housing and is cooled by air flow through adjacent intakes. A plurality of I/O or expansion cards are located along the opposite side of the housing and cooled by air flowing through adjacent side intakes. A plurality of system cards including a processor card and memory cards, are located in parallel, rearwardly extending rows directly between at least some of the front intakes and the fan. A DC/DC regulator card is mounted over the system cards and has a heat sink provided with rearwardly extended cooling fins aligned in the direction of air flow from front to rear.

8 Claims, 3 Drawing Sheets

COMPACT HIGH POWER PERSONAL COMPUTER WITH IMPROVED AIR COOLING SYSTEM

BACKGROUND OF THE INVENTION

The power requirements of personal computers have gradually increased over the past several years, while the sizes of system units, particularly for desktop models, have not increased to the same extent. The general reason for the lack of size increase has been due to miniaturization of components. The increased power requirements thus poses a severe problem of how to efficiently cool the unit and dissipate the heat generated during operation of the computer.

U.S. Pat. No. 4,702,154—Dodson discloses a "COOLING SYSTEM FOR PERSONAL COMPUTER" discloses a cooling system designed for earlier versions of personal computers, such as the IBM PC and XT personal computers. In such system, a combined fan and power supply assembly is mounted with the computer housing. The assembly includes its own housing having an intake open to the interior of the computer housing, whereby coolant air is drawn into the interior of the computer housing through various openings in the housing. Such air them passes over the various components before being drawn into the fan and power supply assembly. The air is then blown over the power supply components and exhausted to the rear of the computer.

U.S. Pat. No. 4,644,443—Swensen et al, discloses a "COMPUTER COOLING SYSTEM USING RECYCLED COOLANT" in which the computer housing is compartmented or divided into two sections, one of which contains low power dissipating components and the other of which contains high power dissipating components including the power supply. A fan is mounted between the sections and draws air in through an intake at the top of the housing. The coolant air then passes downwardly over the low power components and is sucked into the fan. The fan then blows the air upwardly into an inverted U-shaped duct so the air moves upwardly and then downwardly over the high power components before being exhausted.

SUMMARY OF THE INVENTION

One of the objects of the invention is to provide an improved cooling system for a high performance, high power personal computer, in which coolant air is efficiently moved over the system components.

Another object of the invention is to provide an improved personal computer cooling system in which the power supply is split into two sections that are placed in different locations of the computer housing so as to be cooled by different streams of coolant air.

A further object of the invention is to provide a personal computer with an improved air cooling system in which high power dissipating components are cooled by an air stream that moves directly from the front to the back of the interior of the computer housing by means of a fan at the rear of the housing.

Still another object of the invention is to provide an improved air cooling system for a personal computer in which the coolant air flows along three general paths for respectively cooling I/O or expansion cards, a bulk power supply, and high power dissipating components including a DC/DC regulator card.

A still further object is to provide an improved personal computer cooling system in which a DC/DC regulator card is thermally connected to a heat sink having cooling fins aligned with the direction of air flow and spaced from a plurality of cards, including memory and processor card, which are also aligned with the direction of air flow to create a tunneling effect which minimizes flow resistance, guides the direction of flow, and optimizes air speed.

Briefly, in accordance with the invention, a personal computer housing has a plurality of air intake openings located around the sides and front. A fan is mounted at the rear of the housing and sucks or draws coolant air through the intakes and exhausts the air to the rear. A bulk power supply is mounted along one side of the housing and is cooled by air flow through adjacent intakes. A plurality of I/O or expansion cards are located along the opposite side of the housing and cooled by air flowing through adjacent side intakes. A plurality of system cards including a processor card and memory cards, are located in parallel, rearwardly extending rows directly between at least some of the front intakes and the fan. A DC/DC regulator card is mounted over the system cards and has a heat sink provided with rearwardly extended cooling fins aligned in the direction of air flow from front to rear.

DRAWINGS

Other objects and advantages of the invention will be apparent from the following description taken in connection with the accompanying drawings wherein.

DETAILED DESCRIPTION

Figure 1:
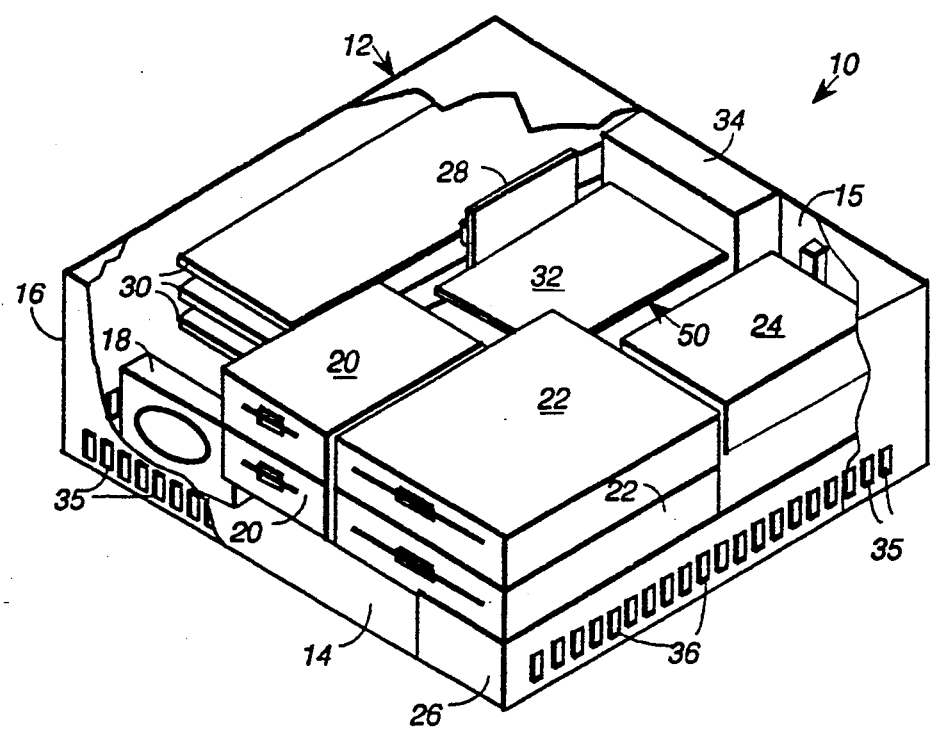
FIG. 1 is a perspective view with portions removed of a personal computer embodying the invention.

Referring now to the drawings, and first to FIG. 1, a personal computer comprises a system unit 10 that includes a housing 12 having a base 14, a rear wall 15, and a cover 16. Various other computer components, such as a keyboard, display, printer (not shown) may be connected to connectors on rear wall 15. The housing is substantially square when viewed from the top and defines a space within which the various components of the system unit are mounted and enclosed. Such components include a speaker 18, two vertically stacked 3½" floppy disk units 20, two vertically stacked 5¼" floppy disk units 22, a hard disk unit 24, a bulk power supply 26, a riser board 28, a plurality of I/O cards 30, a DC power regulator card 32, and a fan 34. The fan is mounted centrally at the rear of the housing for sucking coolant air into the housing through a plurality of air intake openings or louvers 35 located in cover 16 along the bottom edges of the side walls and the front wall of the cover. The coolant air is blown or exhausted through an opening (not shown) in rear wall 15. Bulk power supply 26 has a plurality of openings 36 aligned with adjacent cover openings 35 to admit coolant air into bulk power supply 26. Card 32 and board 28 form part of a modular technology unit (MTU) 50 (FIGS. 3-6).

Figure 2:
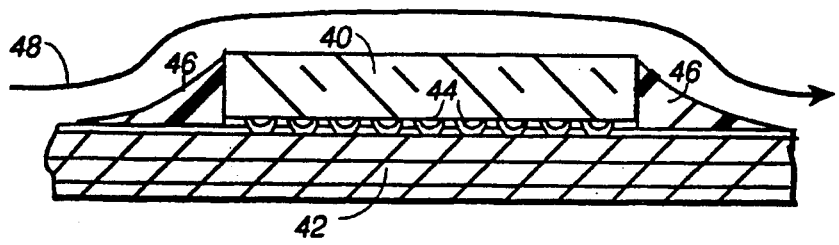
FIG. 2 is a schematic view illustrating a chip mounting technology used in the invention.

The cards described below have functional modules mounted on printed circuits boards (PCBs) using the well known C4 technology. As shown in FIG. 2, with such technology, a module 40 is mounted on a PCB 42 using solder balls 44 to mechanically and electrically connect the module to circuits in the PCB. Module 40 is further attached by an epoxy encapsulant 46 which provides a fillet wall around the module promoting the laminar flow 48 of coolant air over the module and along the surface of the card. The resultant cards are relatively thin and substantially flat.

Figure 3:
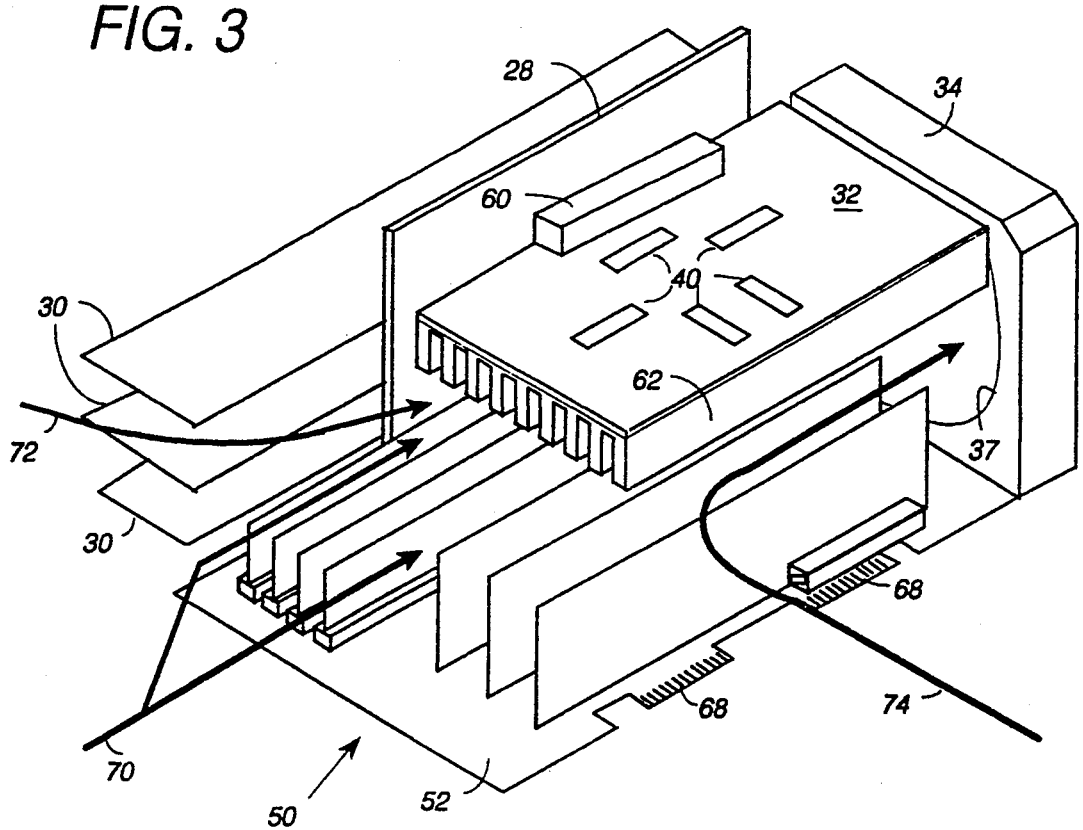
FIG. 3 is a perspective view of the modular technology unit, illustrating coolant air flow.
Figure 4:
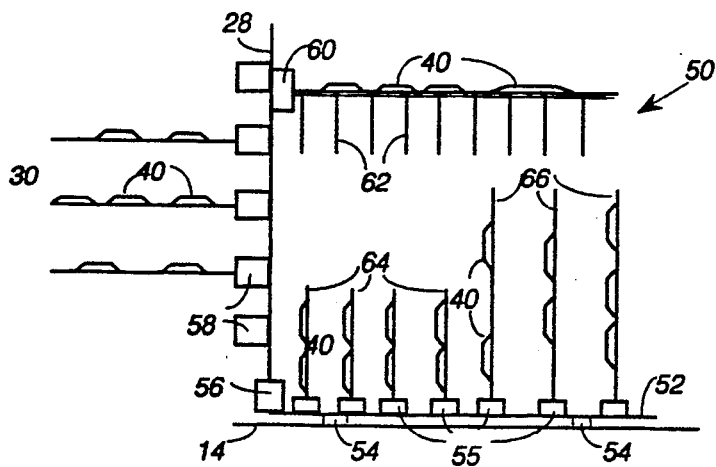
FIG. 4 is a schematic front elevation view, on a reduced scale and with portions removed, of the unit shown in FIG. 3.

Referring to FIGS. 3 and 4, MTU 50 comprises a flat, rectangular PCB 52 mounted on base 14 and spaced slightly thereabove by feet or spacers 54. PCB 52 thus lies in a horizontal plane and has mounted thereon a plurality of edge connectors 55 having upwardly opening sockets that mate with edge contacts on a plurality of cards 64 and 66. Riser board 28 is mounted on and connected to PCB 52 by a connector 56, board 28 having a plurality of edge contacts along its bottom edge mated with corresponding contact members (not shown) in connector 56. Board 28 is flat and rectangular, and lies in a vertical plane extending from front to back within the housing (FIG. 1). Thus, the planes of boards 28 and 52 are mutually perpendicular.

Mounted on board 28 are five edge connectors 58 for mounting and connecting I/O cards 30. As illustrated, only three cards 30 are shown. Obviously, the number of I/O cards may vary dependent upon system configuration. Cards 30 are flat and rectangular and lie in parallel horizontal planes that extend at right angles to one side of the plane of riser board 28. Also mounted on board 28 is a connector 60 for mounting and connecting power regulator card 32 and a finned heat sink 62. Card 32 is flat and rectangular and lies in a horizontal plane located in the rear center of the housing on the side of board 28 opposite to where I/O cards 30 are mounted. Connector 60 is located near the top edge of board 28 whereby the plane of card 32 is spaced above and parallel to the plane of board 52 to provide a sufficient amount of clearance for a plurality of upstanding, single, in-line, memory module (SIMM) cards 64 and system module cards 66 to be mounted on board 52. Cards 64 and 66 are flat and rectangular and lie in parallel vertical planes extending from front to rear. System cards 66 are populated with the various modules that form the "heart" of the computer, which modules include a microprocessor, memory controller, DMA controller, support modules, etc., the exact numbers and functions of which is dependent upon system configuration. The number of SIMM cards 64 depends upon total memory capacity.

Boards 52 and 28 have no functional modules mounted thereon and have only printed circuit wiring for appropriately interconnecting the various cards. Card 52 further has edge contacts 68 for connecting to flat cables (not shown) and off board connectors and components.

Figure 5:
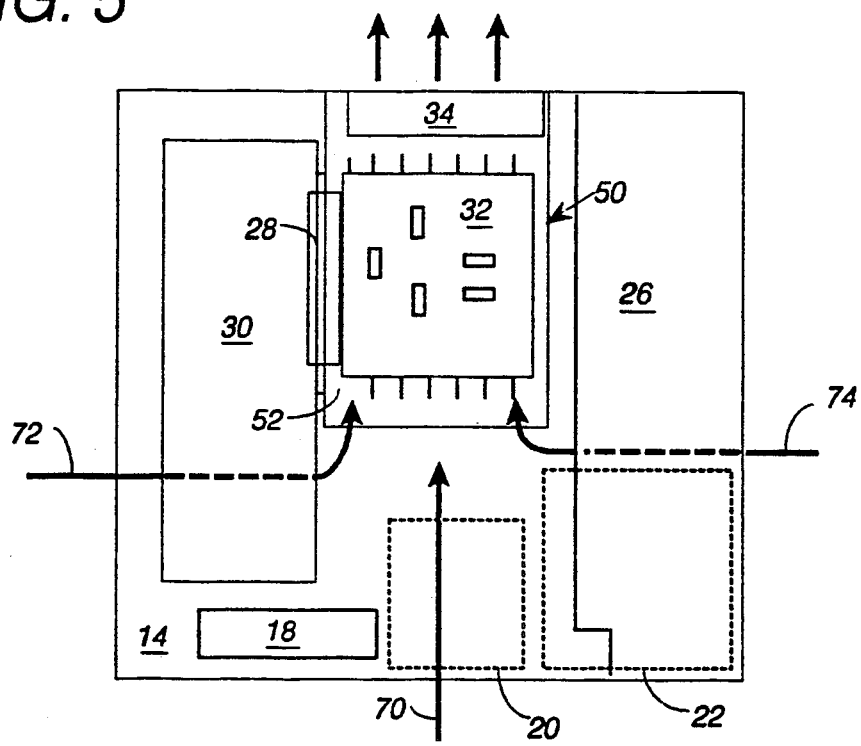
FIG. 5 is a schematic top plan view, with portions removed, illustrating coolant air flow through the computer shown in FIG. 1.
Figure 6:
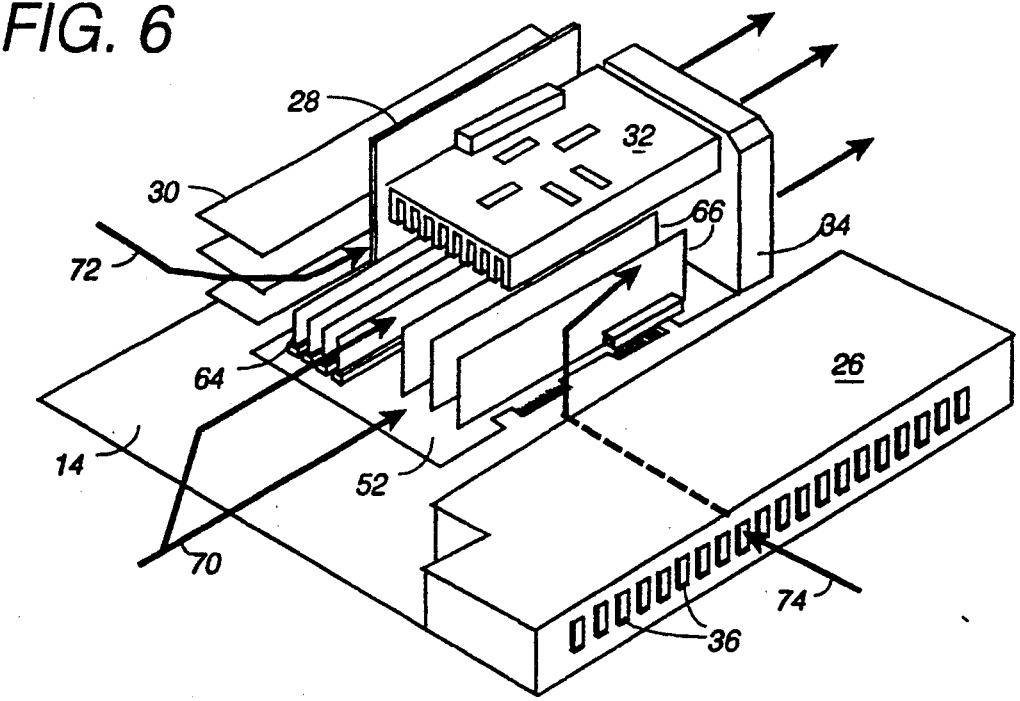
FIG. 6 is a schematic perspective view similar to FIG. 3 providing yet another illustration of coolant air flow.

MTU 50 is constructed and arranged to provide a compact unit having a relatively small "footprint" compared to the footprint of the whole system unit and wherein the I/O cards, the SIMM cards and the system cards (and heat loads) are concentrated. The footprint or plan projection of the size of the unit is primarily dependent on the size of board 52. In an exemplary embodiment, unit 10 has a footprint of about 226 square inches whereas MTU 50 has a footprint of 70 square inches. As best seen in FIGS. 5 and 6, MTU is located on the rear center of base 14 directly in front of fan 34. In contrast, many personal computers include a system or planar board that is spread out horizontally through most of the system unit and upon which various modules, and connectors are mounted. The various boards and cards are also spread out throughout the housing.

The system power supply is split between bulk power supply 26 and a DC/DC regulator card 32. Bulk power supply contains a transformer and rectifier (not shown) for converting a 110 volt AC source to 30 volts DC, and is not highly regulated. As a result, less cooling is required, a secondary/primary feedback is not needed, and voltage rectifier circuitry is more efficient. A higher (100–400 KHz) switching frequency is also used to reduce the size of the transformer magnets (not shown). Card 32 converts the 30 volt DC input from supply 26 to different voltages for operating the components, and uses smart power ASIC chips of the type used in the IBM Model 25 personal computer.

In an exemplary embodiment, a 400 watt power supply is provided and such power is dissipated as follows: 40 watts in bulk power supply 26, 60 watts in regulator card 32, 60 watts in a display monitor (not shown); and 240 watts in the system, SIMM and I/O cards.

MTU 50 locates the elements requiring high power dissipation directly in front of fan 34. The fan has a circular air intake 37 (FIG. 3) in a shroud enclosing a motor and radial fan blades (not shown) which define an air flow path at the fan having a cross sectional area approximately the same size as the cross sectional area of MTU 50. As previously indicated, coolant air is sucked into housing 12 through openings 35 along the front and side bottom edges of cover 16. There are many different detailed paths which the coolant air follows as it flows through the unit, and only three general paths 70, 72, and 74 are described herein. Path 70 flows rearwardly through the front openings 35 located directly in line with fan 34; between base 14, speaker 18, beneath drive 20 and the front left corner of power supply 26; through MTU 50; and into fan 34. After the air passes beneath drive 20, it expands vertically (as illustrated by the split arrows in FIGS. 3 and 6) to additionally flow along the upper portions of MTU 50, which portions include heat sink 62 and regulator card 32. Path 72 flows laterally through the left side openings 35, between I/O cards 30, around riser card 28, and rearwardly through BTU 50 to the fan. Path 74 flows laterally through the right side openings 35, through bulk power supply 26, and then laterally and rearwardly along the right side of MTU 50 to the fan.

The cards having the higher heat generating components thereon are located in primary path 70. The construction and arrangement of MTU creates a tunnelling effect in that the cards 52, 64, 66, and 32, and the heat sink fins are aligned in the direction of primary air flow from front to rear within the housing. The air in paths 72 and 74 enters laterally and after passing over cards 30 and through bulk power supply 26, and mixes with path 70 along the sides thereof, before being exhausted by the fan. With such arrangement, air flow rates of 300 linear feet per minute are achieved, which efficiently cools the system unit.

It should be apparent to those skilled in the art that many changes can be made in the details and arrangements of steps and parts without departing from the scope of the invention as defined in the appended claims.

What is claimed is:

1. A personal computer comprising:

a housing defining a cubical space in which components of said computer are located, said housing comprising a rectangular base, and a cover mounted on and overlying said base, said cover comprising a front and two side walls provided with a plurality of coolant air intake openings, said housing having a rear wall;

a fan mounted in said rear wall for sucking coolant air into said housing through said intake openings and exhausting such air through said rear wall;

a modular technology unit (MTU) mounted on said base directly in front of said fan, said MTU comprising a first printed circuit board (PCB) having a plurality of connectors thereon and internal wiring interconnecting said connectors, said first PCB being flat and lying in a horizontal plane immediately above said base, a riser PCB connected to one of said connectors on said first PCB, said riser PCB being flat and lying in a vertical plane extending rearwardly in said housing, said riser PCB having a plurality of connectors mounted thereon and internal wiring connected to said connectors, a plurality of generally flat cards mounted on said connectors of said first PCB and generally lying in parallel rearwardly extending planes defining between such cards a plurality of rearwardly extending coolant air flow channels, said cards including a plurality of heat generating functional modules for performing data processing functions, and a power regulator card mounted on one of said connectors on said riser PCB and extending along a top edge thereof, said power regulator card being generally flat and lying in a horizontal plane overlying said first mentioned cards and comprising a plurality of heat generating modules for converting a relatively higher DC voltage into a plurality of lower DC voltages for operating said functional modules on said first mentioned cards;

and a bulk power supply mounted on said base, said bulk power supply having openings therein through which coolant air can flow.

2. A personal computer in accordance with claim 1 comprising:

a heat sink thermally contacting said bottom side of said power regulator card for cooling said power regulator card, said heat sink having a plurality of parallel, rearwardly extending vertical fins providing a plurality of rearwardly extending coolant air flow channels therebetween.

3. A personal computer in accordance with claim 2 comprising:

a plurality of I/O cards mounted in said connectors on said riser PCB, said I/O cards being substantially flat and lying in parallel, rearwardly extending horizontal planes on a side of said riser PCB located away from said power regulator card, said I/O cards being spaced vertically to provide a path for coolant air flowing through openings in said cover.

4. A personal computer in accordance with claim 3 wherein:

said fan is mounted centrally of said rear wall;

and said MTU is mounted centrally in front of said fan.

5. A personal computer in accordance with claim 4 wherein:

said vertical plane of said riser PCB is located off center towards one side of said cubical space;

and said I/O cards are located adjacent to one side of said housing.

6. A personal computer in accordance with claim 5 wherein:

said bulk power supply extends along a side of said base and said cover opposite the side thereof closest to said I/O cards.

7. A personal computer in accordance with claim 6 wherein:

said openings in said bulk power supply face laterally and are aligned with adjacent said openings of said cover, whereby coolant air moves through said openings and bulk power supply and then rearwardly along one side of said MTU towards aid fan.

8. A personal computer in accordance with claim 7 wherein:

said openings in said cover are located adjacent a bottom edge thereof;

and said computer further comprises a plurality of disc drives mounted in a front central part of said space above said cover openings, to define a space beneath said disc drives through which coolant air flows directly rearwardly from said openings in front of said covers through said MTU and said fan.

* * * * *